United States Patent
Candiloro et al.

(10) Patent No.: US 8,711,345 B2
(45) Date of Patent: Apr. 29, 2014

(54) OPTICAL ANGULAR POSITION DETECTION APPARATUS AND METHOD

(75) Inventors: Carl Brian Candiloro, Hudson, MA (US); Brian Patrick Stokes, Windham, NH (US); Robert T. Milkowski, Shirley, MA (US)

(73) Assignee: Nutfield Technology, Inc., Hudson, NH (US)

(*) Notice: Subject to any disclaimer, the term of this patent is extended or adjusted under 35 U.S.C. 154(b) by 0 days.

(21) Appl. No.: 13/473,763

(22) Filed: May 17, 2012

(65) Prior Publication Data
US 2012/0293792 A1 Nov. 22, 2012

Related U.S. Application Data (60) Provisional application No. 61/488,217, filed on May 20, 2011.

(51) Int. Cl.
*G01B 11/26* (2006.01)

(52) U.S. Cl.
USPC .......................... 356/138; 356/152.2

(58) Field of Classification Search
USPC ...................... 356/138, 152.1, 153; 250/231.13–231.14, 239, 235, 236, 250/216
See application file for complete search history.

(56) References Cited

U.S. PATENT DOCUMENTS

| | | |
|---|---|---|
| 5,844,673 A | 12/1998 | Ivers |
| 6,921,893 B1 | 7/2005 | Petschik et al. |
| 7,688,432 B1 * | 3/2010 | Benner, Jr. .................... 356/138 |

\* cited by examiner

*Primary Examiner* — Tri T Ton
(74) *Attorney, Agent, or Firm* — Cesari and McKenna, LLP

(57) ABSTRACT

An annular position detection method provides a plurality of light emitters on a first imaginary circle centered on an axis, the emitters directing individual, well-defined, overlapping light beams to a pair of light detectors positioned on a second imaginary circle centered on that axis. The detectors include pairs of diametrically opposite photosensors producing outputs depending upon the areas thereof exposed to light from the emitters. A light blocker is rotatably mounted on the axis so that the blocker blocks light to different extents of the photosensors depending upon its orientation about the axis. The outputs from all of the photosensors are processed to produce a position signal that varies with the angular position of the blocker and the relative intensities of the emitters are adjusted so that the position signal is substantially linear at all operative angles of the blocker. Apparatus for practicing the method is also disclosed.

14 Claims, 7 Drawing Sheets

OPTICAL ANGULAR POSITION DETECTION APPARATUS AND METHOD

CROSS-REFERENCE TO RELATED APPLICATIONS

The present application claims the benefit of Provisional Application No. 61/488,217, filed on May 20, 2011, the entire contents of which are incorporated by reference herein.

BACKGROUND OF THE INVENTION

This invention relates to an angular position detector for determining the position of a shaft or other rotary member. It relates especially to an optical angular position detector which uses a plurality of light emitters and light detectors to achieve that determination and to a detection method utilizing same.

An angular position detector is often used in conjunction with an optical scanner to cause a light beam, e.g. a laser beam, to follow a selected path. The scanner may include a motor which rotates or oscillates a shaft supporting a mirror which intercepts the beam and redirects it to follow a selected path on a surface in order to perform work of some kind, e.g. etching, heating, scribing, photoexposing, etc. For that beam path to be true, it is essential that the position detector provide an accurate real-time indication of the current shaft position at all operative angles of the shaft.

Many present day scanners have position detectors which utilize a moving-dielectric-element capacitance sensor to monitor the shaft position because that type detector is highly accurate. In other words, the output of the detector is substantially linear, i.e. 99.9%, at all operative positions of the shaft, e.g. out to ±25°. However, capacitive-type position detectors do have drawbacks which limit their use for some applications. More particularly, they require an oscillator to excite the capacitance sensor. This increases the overall size and cost of the position detector. Also, capacitive position detectors are susceptible to interference from RF sources such as cell phones, and the output of such detectors can drift with changes in temperature and/or humidity.

To avoid such problems, optical angular position detectors are being used in many present day scanners. Conventional such detectors comprise a plurality of light detectors arranged circumferentially around a center point or axis and a light blocker spaced in front of and parallel to the detectors and arranged to be rotated about said axis. Typically, the blocker is mounted to the end of a rotary scanner shaft extending along said axis. The detectors are arranged to receive light from a light source, e.g. a LED, that is not intercepted by the blocker. The light source may be a single emitter located in front of the blocker so that it can illuminate all exposed areas of all the detectors; see U.S. Pat. No. 5,844,673. Alternatively, as shown in U.S. Pat. No. 6,921,893, a plurality of light emitters may be located beside the detectors with the light from those emitters being directed to a reflector spaced in front of the blocker so that diffuse light from all the emitters is reflected back to all areas of all the detectors that are not covered by the blocker. In other words, from the point of view of the detectors the light from all the emitters is circumferentially uniform.

Thus, in both cases, the blocker exposes all of the detectors to light from all of the emitters in an amount which corresponds to the angular position of the blocker about said axis. Resultantly, the position detector produces an electrical output which may be correlated to the angular position of the shaft. That output may then be processed by a control circuit to provide a determination of the shaft position.

One major problem with the existing optical position detectors is that the shaft position accuracy is not as high as that of a conventional capacitive position detector. In other words, the output of the optical position detector is not actually linear for all angular excursions of the shaft. Whereas a capacitive position detector may have an accuracy of 99.9% out to ±20° shaft angle as noted above, the output of known optical position sensors may only be linear out to the standard scanning angle of ±10°, with the linearity falling off by as much 0.5-1.0% for angles greater than that. Accordingly, it would be desirable to be able to provide an optical position detector which has the positional accuracy of a capacitive detector while avoiding the above-mentioned drawbacks of the latter.

SUMMARY OF THE INVENTION

Accordingly, the present invention aims to provide an optical angular position detector with improved positional accuracy.

Another object of the invention is to provide such a detector which can be made at relatively low cost.

Still another object of the invention to provide a position detector of this type whose output is close to linear throughout its angular operating range.

A further object of the invention is to provide an optical angular position detection method having high positional accuracy.

Still another object of the invention is to provide a scanner incorporating an optical angular position detector having one or more of the above advantages.

Other objects will, in part, be obvious and will, in part, appear hereinafter.

The invention accordingly comprises the several steps and the relation of one or more of such steps with respect to each of the others, and the apparatus embodying the features of construction, combination of elements and arrangement of parts which are adapted to affect such steps, all as exemplified in the following detailed disclosure, and the scope of the invention will be indicated in the claims.

The present optical angular position detector has in common with prior such detectors a plurality of circumferential or arcuate light detector elements extending about an axis and a light blocker or shutter spaced in front of, and parallel to, the light detector elements, the blocker being mounted to a rotary scanner shaft extending along said axis. However, the present optical position detector differs substantially from the prior ones in that, instead of delivering a uniform or homogeneous distribution of light to all unblocked or exposed areas of the detector elements, it employs a light emitter array centered on the axis so that the emitters in the array direct a plurality of individual, well-defined, overlapping light beams to different exposed or unblocked areas of the plurality of detector elements.

Prior to use, the present position detector undergoes a calibration wherein the current to some or all of the emitters is adjusted using a process of linear regression or "least squares fit to line" so that the output of the position detector is made substantially linear, i.e. 99.9% or better, for all scanning angles out to ±10°, with a loss in linearity of only 0.5% or less as the scanning angle is increased from ±10° to ±20°.

BRIEF DESCRIPTION OF THE DRAWINGS

For a fuller understanding of the nature and objects of the invention, reference should be made to the following detailed description taken in connection with the accompanying drawings, in which.

DETAILED DESCRIPTION OF AN ILLUSTRATIVE EMBODIMENT

Figure 1:
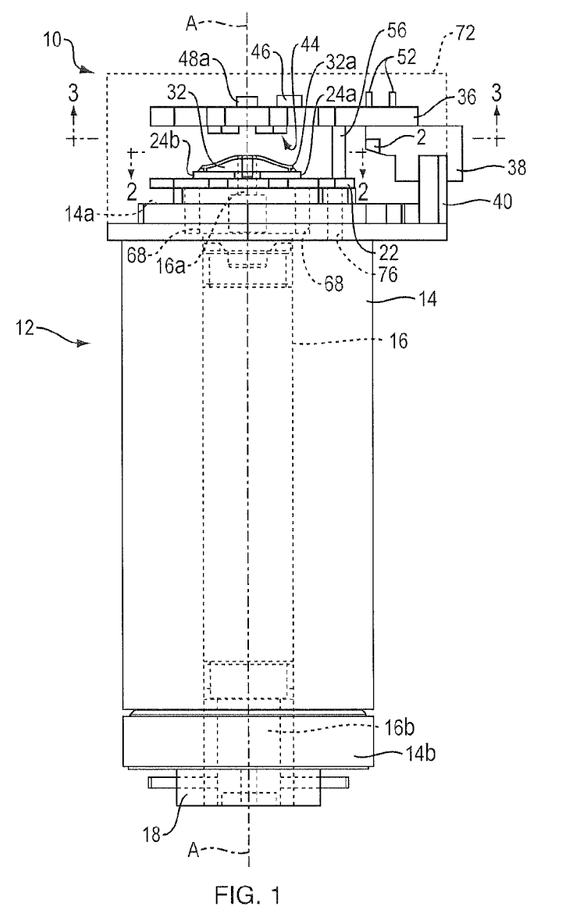
FIG. 1 is a side elevational view of a scanner equipped with an optical position detector according to this invention.
Figure 2:
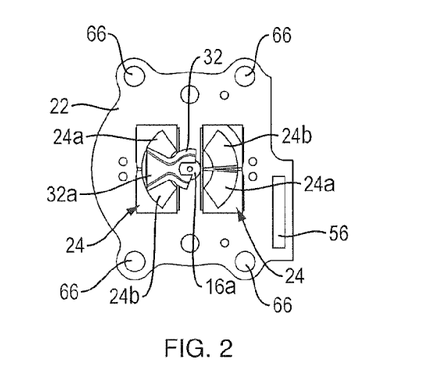
FIG. 2 is a view taken along line 2-2 of FIG. 1 showing the light detectors of the optical position detector in that figure.

Referring to FIGS. 1 and 2 of the drawings, an optical angular position detector shown generally at 10 is mounted to the end of a scanner indicated generally at 12. Scanner 12 may be of any known type and normally includes a housing 14 having opposite ends 14a and 14b and containing a motor field coil (not shown). Supported within the housing is a motor shaft 16 which is rotatable about an axis A-A. The shaft has one end 16a projecting from housing end 14a into the position detector 10 and an opposite end 16b extending from housing end 14b and terminated by a hub 18. If the scanner is an optical scanner, a mirror (not shown) may be mounted to the hub so that when the scanner is operative, a light beam may be scanned across a working surface.

Seated on the upper end 14a of housing 14 is a printed circuit board (PCB) 22 on which is formed at least one and preferably a pair of mirror image, two-element light detectors 24, 24 positioned at diametrically opposite locations on an imaginary circle centered on axis A-A. Each light detector 24, 24 is composed of two relatively large area, sector-shaped light detector elements or photosensors 24a and 24b.

As shown in FIGS. 1 and 2, a shutter or light blocker 32 is mounted to the top of motor shaft 16a for rotation therewith. The blocker extends just in front of the light detectors 24, 24 and has opposite fan-shaped ends 32a each of which may cover more or less one of the photosensors 24a, 24b of one of the light detectors depending upon the angular position of the blocker relative to the detectors. In other words, each end 32a moves along an arcuate path whose ends are opposite the photosensors. As is well known in the art, the photosensors 24a and 24b of each light detector 24, 24 generate outputs which are proportional to their areas exposed to light. The outputs of the diametrically opposite photosensors 24a, 24a; 24b, 24b are summed individually and the two summed currents may be applied to the two inputs of a processing device such as a differential amplifier (not shown) to produce a difference or position signal which reflects the angular position of the shutter 32 and thus of the motor shaft 16.

Figure 3:
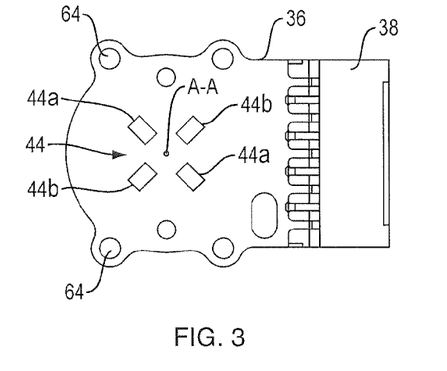
FIG. 3 is a view taken along line 3-3 of FIG. 1 showing the light emitter array of the optical position detector in that figure.
Figure 5:
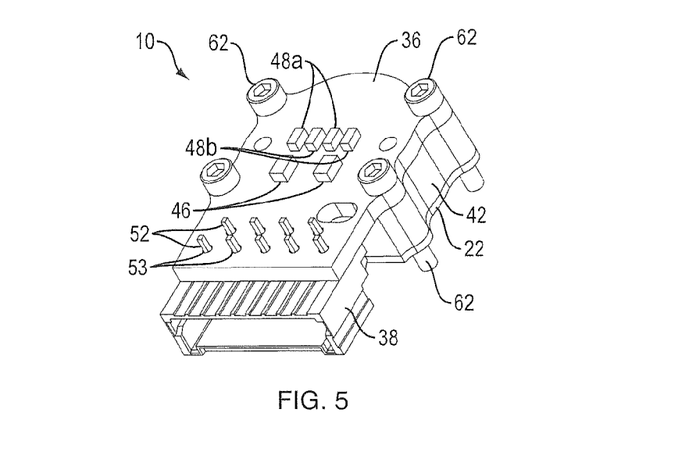
FIG. 5 is a perspective view of the optical position detector.

Referring now to FIGS. 1 and 3, spaced above blocker 32 is a second printed circuit board (PCB) 36 which extends parallel to PCB 22. Mounted to the underside of PCB 36 is a female connector 38 which is supported by a fixture 40 extending up from housing end 14a. Additional spacer structure 42 which extends between the edge margins of PCBs 22 and 36 has been omitted from FIG. 1 for ease of illustration, but is shown in FIG. 5 along with the connector 38. Also, mounted to the underside of PCB 36 is an array 44 of light emitters, e.g. LEDs. The illustrated emitter array includes four light emitters 44a, 44b, 44a, 44b positioned symmetrically on a second imaginary circle centered on axis A-A so that emitters 44a, 44a and 44b, 44b each form diametrically opposite corresponding emitter pairs. Thus, in this array 44, emitters 44a, 44a are more or less centered over photosensors 24a, 24a and emitters 44b, 44b are directly above photosensors 24b, 24b.

Figure 4:
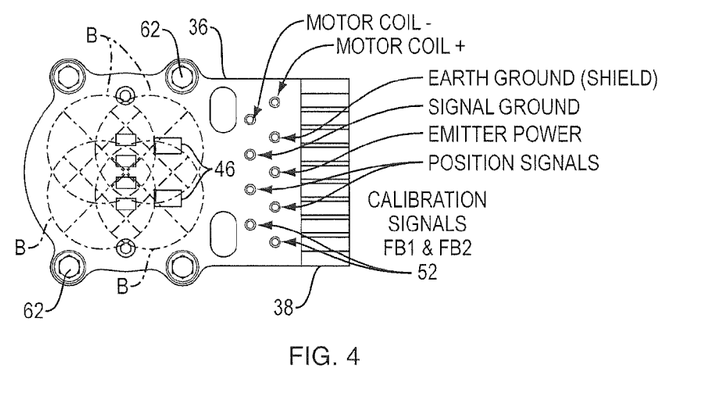
FIG. 4 is a top plan view of the optical position detector.

As shown in FIGS. 1, 4, and 5, present on the top face of PCB 36 for each emitter pair are a current calibration or balancing circuit 46 and a pair of calibration resistors 48a, 48b. Also, as best seen in FIG. 5, a plurality of pins 52 project up from connector 38 through small holes 53 in PCB 36. These pins establish connections between corresponding contacts (not shown) inside connector 38 and the printed circuit paths or traces (not shown) on PCB 36 that connect certain pins 52 and one or more of the elements 44, 46 and 48a-48d. A male cable connector (not shown) may be plugged into connector 38 to establish connections between the optical position detector 10 and a power supply and other scanner subsystems. Further, as shown in FIG. 1, an elastomeric interconnect 56 extends between PCBs 22 and 36 to electrically connect the scanner motor and the printed circuit paths of PCB 22 to certain pins 52. The operative signals on those pins are indicated in FIG. 4.

The elements of the position detector 10, shown as a whole in FIG. 5, are secured to each other and to scanner 12 by bolts 62 which extend down through holes 64 (FIG. 3) in PCB 36 and through holes 66 (FIG. 2) in PCB 22 and are turned down into registering threaded holes 68 (FIG. 1) in the upper end 14a of scanner housing 14.

Figure 6:
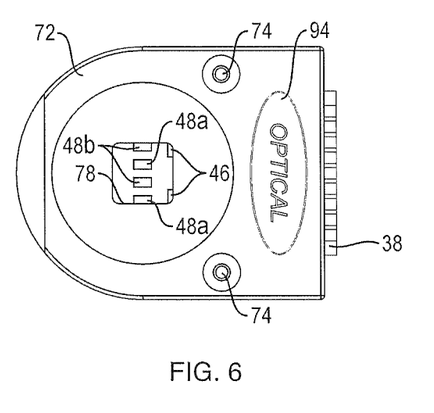
FIG. 6 is a top plan view of the FIG. 1 scanner.

To protect the components of the position detector 10, a cover 72 may be engaged over the position detector as shown in broken lines in FIG. 1 and in solid lines in FIG. 6. The cover 72 may be held in place by a pair of fasteners 74 which extend down through the cover and are turned down into threaded holes 76 (FIG. 1) in the upper end 14a of scanner housing 14. To facilitate the calibration of the position detector to be described later, an access opening 78 may be provided in the top of cover 72 as shown in FIG. 6 to afford access to the calibration resistors 48a, 48b, which opening may be closed by adhering a name plate (not shown) to the top of the cover after completion of the calibration process.

Figure 7:
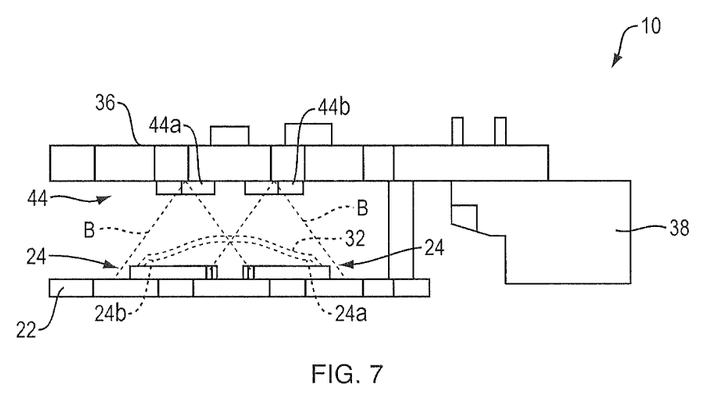
FIG. 7 is a side elevational view of the position detector in FIG. 1 showing individual light beams directed by the emitter array to the light detectors.

In accordance with this invention, instead of subjecting all the photosensors 24a, 24b of the light detectors 24, 24 to homogeneous or diffuse light from the emitter(s) as has been done heretofore, the emitter array 44 of the position detector 10 directs to the detectors a defined, relatively wide angle light beam B from each of the emitters 44a, 44a, 44b, 44b of the array 44 as seen in FIGS. 4 and 7. Resultantly, as shown there, the photosensors 24a, 24b are, absent the blocker 32, illuminated by four separate, distinct, overlapping circles of light. As we shall see, the intensities of the emitter beams may be adjusted during the calibration process to be described so that the position detector 10 produces a substantially linear output at all operative angles of the shutter 32.

As described above in connection with FIG. 3, the position detector detailed thus far has an emitter array 44 with two corresponding pairs of emitters arranged symmetrically about axis A-A such that emitters 44a, 44a are more or less centered over photosensors 24a, 24a, while emitters 44b, 44b are centered over photosensors 24b, 24b. However, it should be understood that other axially symmetric emitter arrays are possible some of which are illustrated in FIGS. 8A to 8D.

Figure 8A:
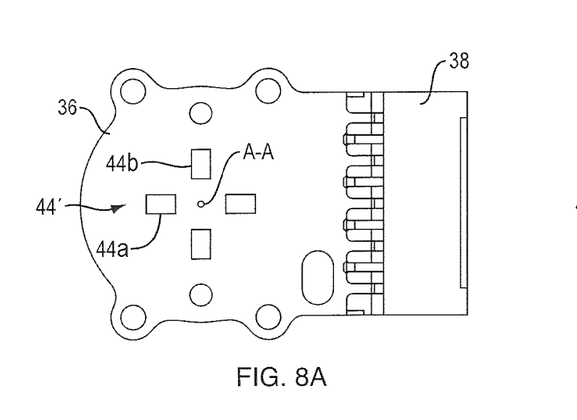
FIGS. 8A-8D are views similar to FIG. 3, showing various light emitter array embodiments according to the invention.
Figure 8B:
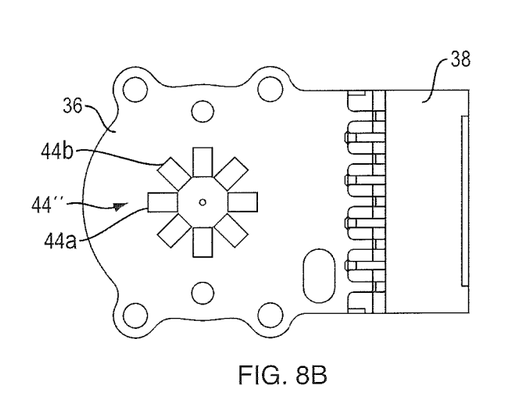
Figure 8C:
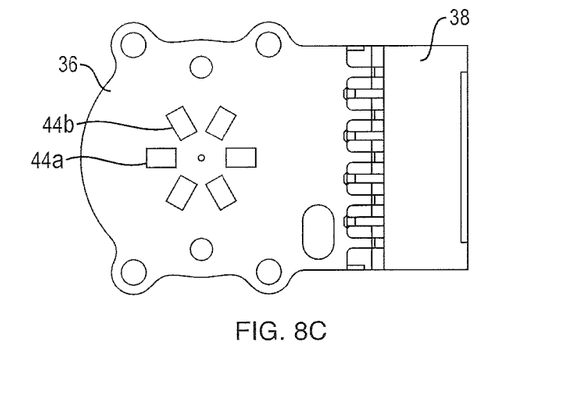
Figure 8D:
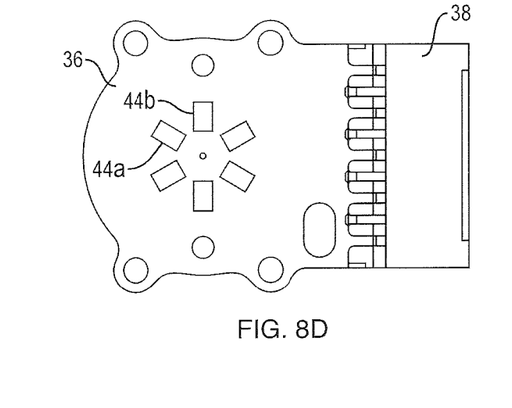

Thus, FIG. 8A shows another two-pair array 44' whose emitters 44a, 44b are angularly displaced 45° with respect to those in FIG. 3 so that they are disposed over gaps between the photosensors 24a and 24b. FIG. 8B shows a four-pair array 44" of eight emitters, while FIGS. C and 8D depict angularly displaced three-pair arrays. The presence of additional emitter pairs allows closer control over the light incident on the light detectors 24, 24, but increases the overall cost of the scanner.

Figure 9:
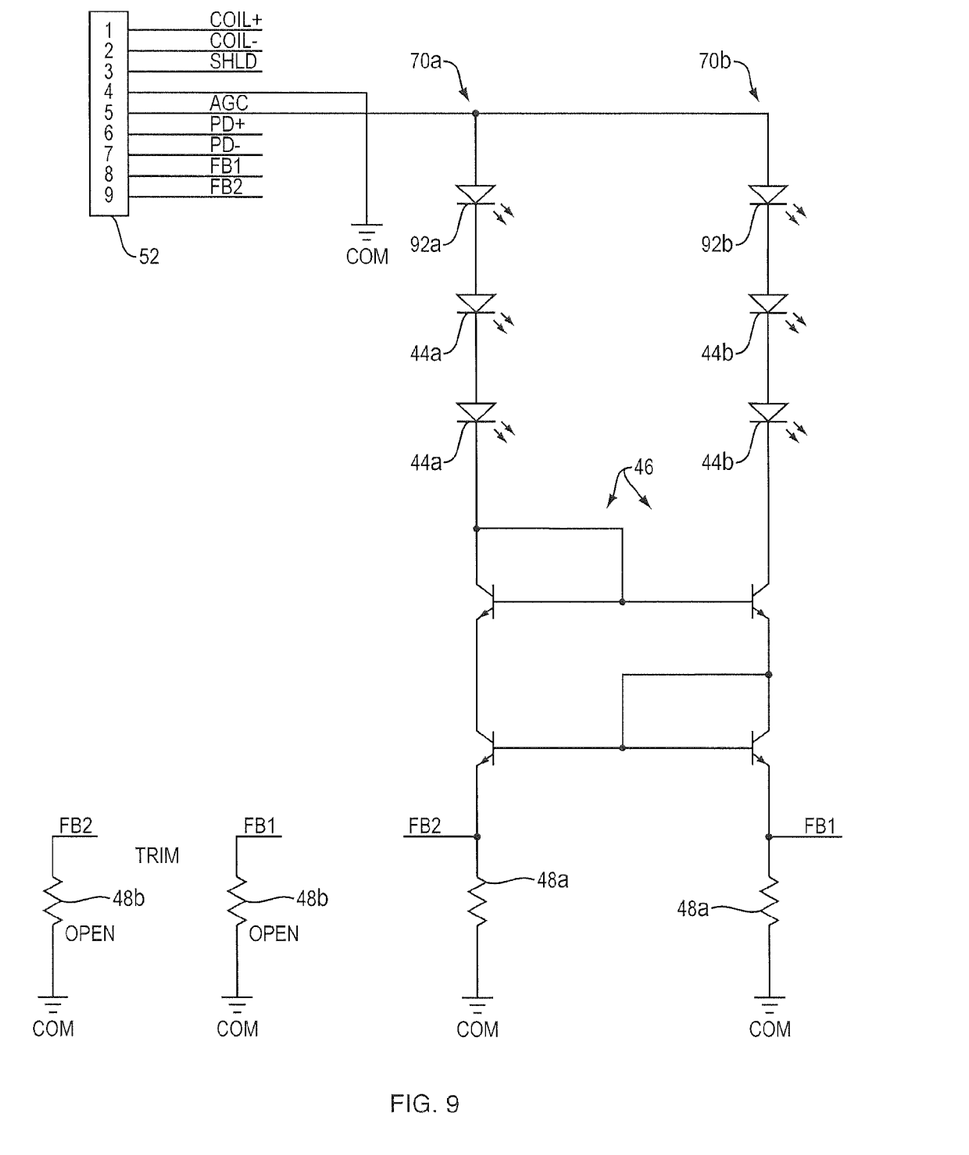
FIG. 9 is a schematic diagram of the emitter calibration circuitry in the position detector shown in FIG. 1, and FIGS. 10A and 10B are waveforms illustrating the calibration according to the invention of the position detector in FIG. 1.

Refer now to FIG. 9 which shows a calibration circuit 46 with two similar control channels 70a and 70b suitable for controlling the two-pair arrays of four emitters shown in FIGS. 3 and 8A. The illustrated circuit happens to include a pair of LEDs 92a and 92b which are used to illuminate a translucent "OPTICAL" name plate 94 on the scanner cover 72 shown in FIG. 6. The resistors 48a in each channel may be nominal set-point resistors with resistors 48b and 48b being used as trim resistors. Higher value resistors may be substituted or, using a laser, one or both resistors 48a may be etched in situ via the opening 78 in cover 72 (FIG. 6) to increase resistance in one or both channels 70a, 70b. On the other hand, one or more resistor 48b may be connected in parallel with one or both resistors 48a to reduce the resistance in one or both channels. In any event, once the desired resistance values are determined for each channel 70a, 70b during the calibration process that appropriately set the relative intensities of the four beams B from the emitter array 44, the detector 10 is calibrated so that its output is substantially linear over the operative range of the detector.

Of course, if the particular position detector 10 should have an emitter array with more than two pairs of emitters, the FIG. 9 circuit would have additional control channels to support the additional emitter pairs.

There follows the sequence of steps to calibrate the position detector 10:
1. rotate shaft 16 to selected angular positions, e.g. +/-20° in 1° steps;
2. measure position at each degree point;
3. calculate line of best fit by data collection and calculation using Excel Spreadsheet (trend line, slope and intercept function);
4. calculate worst case error from measured data to line of best fit;
5. adjust current ratio between emitters while monitoring and manipulating FB1 and FB2 by adjusting one or more of resistors 48a-48b to reduce worst case error, and
6. repeat Steps 1-5 until best linearity is achieved.

Figure 10A:
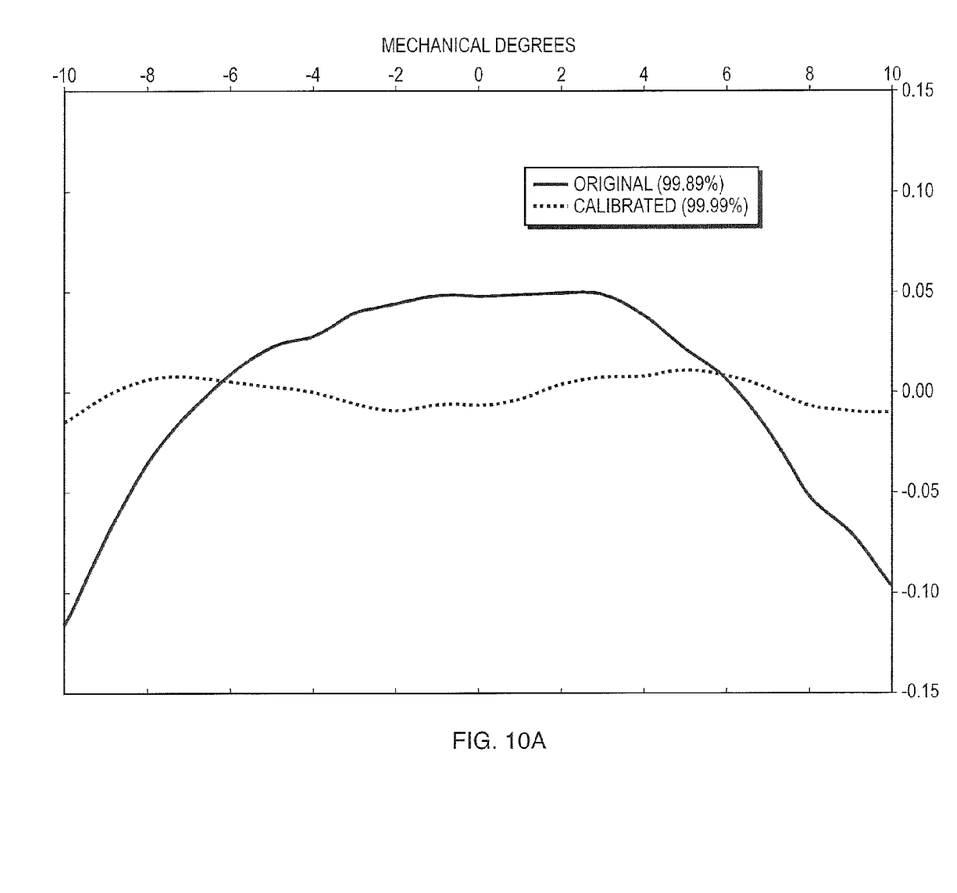
Figure 10B:
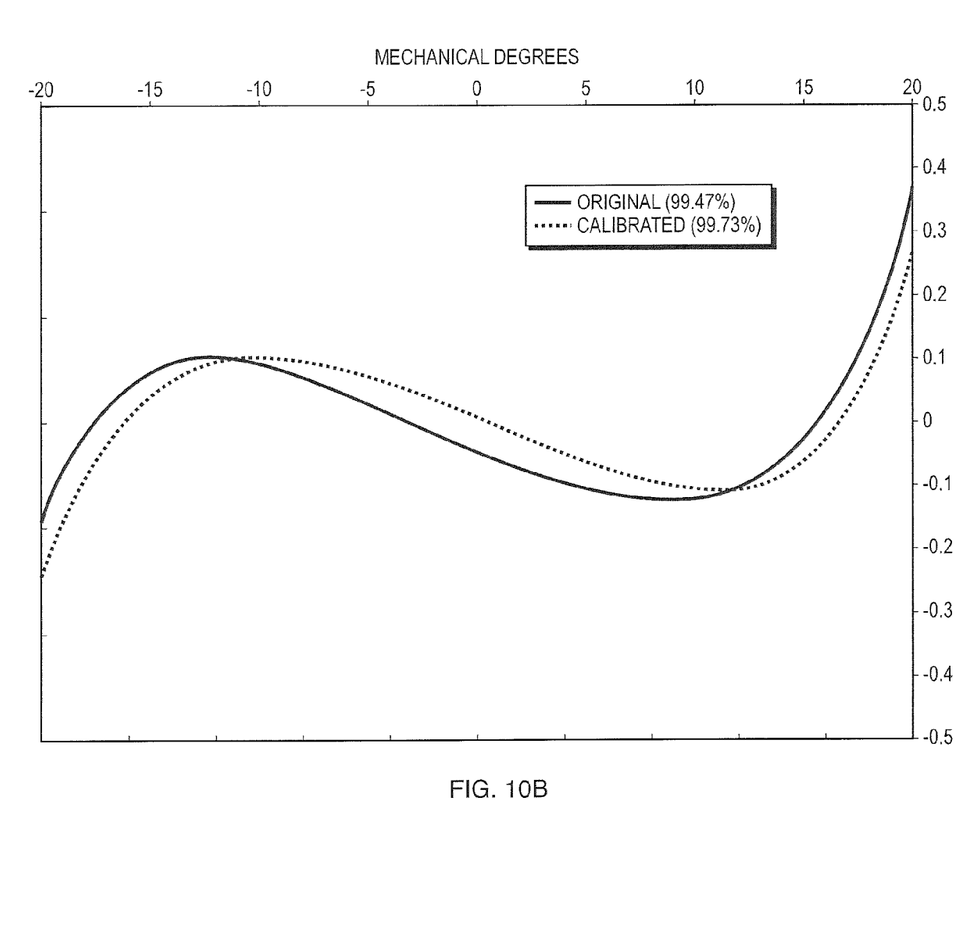

Examples of waveforms showing angular position error before and after calibration are depicted in FIGS. 10A and 10B. The waveforms show marked improvement in linearity out to the ±10° standard scanning angle and smaller but still significant improvement from ±10° to ±20°.

The aforesaid process can be optimized for production of the position detector 10 by automating the shaft rotation, data collection and error calculations with readily available laboratory hardware and software.

It will thus be seen that the objects set forth above, among those made apparent from the preceding description, are efficiently attained. Also, certain changes may be made in carrying out the above method and in the construction set forth without departing from the scope of the invention. For example, in some applications, the detector may comprise a single pair of light emitters 44a, 44b which illuminate a single pair of detector elements 24a, 24b as determined by a blocker 32 having only one light-blocking end 32a. Therefore, it is intended that all matter contained in the above description as shown in the accompanying drawings shall be interpreted as illustrative and not in a limiting sense.

What is claimed is:

1. An angular position detection apparatus comprising
   a first light detector disposed on a first imaginary circle centered on an axis, said first light detector including first and second photosensors spaced side-by-side, each photosensor producing an output depending upon the area thereof exposed to light;
   at least one pair of light emitters spaced in front of said first light detector on a second imaginary circle centered on said axis, said light emitters being arranged and adapted to direct separate, well-defined, overlapping light beams simultaneously to all the photosensors;
   a light blocker rotatably mounted on said axis between the detector and emitters, said light blocker being arranged and adapted to block the light to different extents of said first and second photosensors depending on its orientation about said axis;
   a processor responsive to the outputs from all the photosensors for producing a position signal that varies with the angular position of the light blocker; and
   a calibration circuit for adjusting, independently, an intensity of each light emitter so that the position signal is substantially linear at all operative angles of the light blocker.

2. The apparatus defined in claim 1 and further including
   a second pair of light emitters positioned on said second circle;
   a second similar light detector positioned on said first circle and exposed to light from the overlapping light beams, said second light detector including first and second photosensors positioned, respectively, diametrically opposite the first and second photosensors of the first light detector, the photosensors of the second light detector being blocked by the light blocker to substantially the same extents as the corresponding photosensors of the first light detector; and
   the processor first sums the outputs of the first photosensors and the second photosensors separately in order to produce said position signal.

3. The apparatus defined in claim 1 wherein the calibration circuit includes a separate control channel for each light emitter pair, each channel containing that pair of light emitters connected in series and further connected in series or in parallel with one or more resistors.

4. The apparatus defined in claim 2 wherein each light emitter is positioned directly opposite a different one of the photosensors.

5. The apparatus defined in claim 2 wherein each light emitter is located directly opposite a space between different adjacent ones of the photosensors.

6. The apparatus defined in claim 2 wherein multiple pairs of light emitters are distributed around said second circle and direct separate, well-defined, overlapping light beams to all of the photosensors whose outputs are processed by the processor to provide said position signal.

7. The apparatus defined in claim 2 wherein each light emitter is a light emitting diode.

8. The apparatus defined in claim 2 wherein the first light detector is a split diode that constitutes the first and second photosensors.

9. The apparatus defined in claim 2 wherein
   the detection apparatus is mounted to an end of a scanner including a rotary shaft extending along said axis; and said light blocker is fixed to an end of said shaft so that said position signal indicates the angular position of the shaft.

10. An annular position detection method comprising:

providing a plurality of light emitters positioned on a first imaginary circle centered on an axis, said emitters directing individual, well-defined, overlapping light beams to a pair of light detectors positioned on a second imaginary circle centered on said axis, said detectors including corresponding pairs of diametrically opposite spaced-apart photosensors which produce outputs depending upon the areas thereof exposed to light from the emitters;

rotatably mounting a light blocker on said axis between the emitters and detectors so that said blocker blocks light to different extents of the photosensors depending upon its orientation about said axis;

processing said outputs from all of the photosensors to produce a position signal that varies with the angular position of the blocker; and adjusting, independently, an intensity of each emitter so that said position signal is substantially linear at all operative angles of the light blocker.

11. The method defined in claim 10 wherein a plurality of pairs of diametrically opposite emitters are provided on said first circle.

12. The method defined in claim 11 wherein two pairs of emitters are provided.

13. The method defined in claim 12 wherein the emitters are located opposite the photosensors.

14. The method defined in claim 12 wherein the emitters are angularly offset from the photosensors.

* * * * *